Patented Nov. 17, 1931

1,832,476

UNITED STATES PATENT OFFICE

JOHN F. BROEKER, OF CLEVELAND, OHIO, ASSIGNOR, BY MESNE ASSIGNMENTS, TO KREBS PIGMENT & COLOR CORPORATION, OF WILMINGTON, DELAWARE, A CORPORATION OF DELAWARE

PROCESS FOR THE PREPARATION OF LITHOPONE-OIL PULP OR PAINT MIXTURES

No Drawing.    Application filed December 27, 1927.   Serial No. 242,978.

This invention relates to a new and useful process for producing a paint compound of lithopone and drying oil.

Frequently it is of considerable advantage in making paints to prepare the oil-paint paste directly from an aqueous suspension of the pigment instead of incorporating the dry or semi-dry pigment into the oil. This has been accomplished with different pigments such as carbon black or antimony oxide, but all previous attempts to prepare lithopone in this manner have failed.

I have now found a process whereby lithopone oil-pastes or pulps are prepared directly from an aqueous lithopone suspension. This process consists substantially in mixing an aqueous lithopone slurry with a drying oil and reacting upon this mixture with a saponifying agent.

To enable others skilled in the art to avail themselves of my invention, I will now proceed to describe an example of my process in detail.

I prepare an aqueous suspension of one part of lithopone in two parts of water. To this suspension I add a small quantity of an inorganic salt which I call the saponifying agent. Then I add gradually, i. e., continuously or in small portions, approximately 15.5% (calculated on the weight of lithopone) of a linseed oil having an acid value of about 7, simultaneously heating the mixture to 180–190° F. and agitating it vigorously. I continue agitating for 10–30 minutes after the addition of the oil is complete, then allowing the mixture to settle. Thereupon the oil including the pigment will separate from the water and settle to the bottom, leaving the blue of the lithopone in the water, which latter may be removed by any conventional means.

The saponifying agent comprises generally more or less soluble compounds of the alkali and earth alkali metal salts, including magnesium, which dissolve in water rendering a more or less alkaline solution. An addition of a small quantity will produce the desired effect. The following six salts are an example of a suitable saponifying agent and the quantities required thereof:

| Compound | Quantity required in per cent of weight of lithophone |
|---|---|
| (1) Trisodium phosphate | 0.2 |
| (2) Magnesium oxide | 0.02 |
| (3) Sodium hydroxide | 0.024 |
| (4) Sodium carbonate | 0.04 |
| (5) Barium hydroxide | 0.06 |
| (6) Calcium hydroxide | 0.1 |

Where I use in this specification or in the appended claims the term "saponifying agent", it is with reference to the foregoing definition.

The addition of these salts produces slight saponification of the linseed oil resulting in the formation of a certain amount of linoleic and linolenic soaps in the solution. The favorable effect of these salts is due to the formation of these soaps. I have found that the best effect is produced if soluble soaps are formed by the addition of the saponifying agent. In other words, I find the alkali metal salts of higher efficiency than the others and among these alkali metal salts trisodium phosphate produces the desired effect most readily.

While I have described in the foregoing my invention by way of example it is understood that its scope is extended to all modifications which may be devised by anyone skilled in the art, as, for instance, adding the oil in relatively large portions or changing the order in which oil and saponifying agent are added.

Generally the details of the procedure of heating and agitating as stated in the example may be tangibly varied without departing from the spirit of this invention.

Instead of the linseed oil mentioned in the above example, I can use other drying oils, such as prepared tung oil, candle nut oil, hemp seed oil, Perilla oil, soya bean oil, etc. For the best performance of my invention, it is, however, advisable to use a drying oil of a high acid number, those having an acid number greater than four being preferred as their mixtures with lithopone water slurries are most responsive to the treatment with a saponifying agent. It is also possible to use mixtures of drying oils and comparable results are obtained. In such a case it is also preferred that one of the components, at least, be of a sufficiently high acid number.

I claim:

1. Process of producing a linseed oil-lithopone paste which comprises adding approximately 15.5% of linseed oil and about 0.2% of trisodiumphosphate calculated on the weight of lithopone to an aqueous suspension of one part lithopone in two parts of water, heating and agitating the mixture, subsequently allowing it to settle, and finally separating the supernatant water.

2. Process of producing a linseed oil-lithopone paste comprising adding approximately 15.5% of linseed oil and about 0.2% of trisodiumphosphate calculated on the weight of lithopone to an aqueous suspension of one part lithopone in two parts of water, heating the mixture to 180–190° F., agitating it and subsequently allowing it to settle.

3. Process of producing a linseed oil-lithopone paste comprising adding approximately 15.5% of linseed oil and about 0.2% of trisodiumphosphate calculated on the weight of lithopone to said suspension of one part lithopone in two parts of water, heating the mixture to 180–190° F., agitating it vigorously for 10–30 minutes, and allowing it to settle, and finally separating the supernatant water.

4. Process of producing an oil-lithopone paste which comprises mixing a drying oil having an acid number greater than four, an aqueous suspension of said pigment and a small amount of tri-sodium phosphate, and heating and stirring the said mixture.

In testimony whereof, I affix my signature.

JOHN F. BROEKER.